US008892746B2

(12) United States Patent
Burckart et al.

(10) Patent No.: US 8,892,746 B2
(45) Date of Patent: Nov. 18, 2014

(54) ASYNCHRONOUS INVOCATION MECHANISM IN SESSION INITIATION PROTOCOL (SIP) SERVER CLUSTERS

(75) Inventors: Erik J. Burckart, Raleigh, NC (US);
Anat Fradin, Rehovot (IL); Roman Mandeleil, Ness Ziona (IL); Nitzan Nissim, Tel-Aviv (IL); Brian Pulito, Lexington, KY (US); Galina Rubinshtein, Holon (IL); Uri Segev, Or-Yehuda (IL)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 12/649,747

(22) Filed: Dec. 30, 2009

(65) Prior Publication Data

US 2011/0161518 A1    Jun. 30, 2011

(51) Int. Cl.
*G06F 15/16* (2006.01)
*G06F 9/54* (2006.01)

(52) U.S. Cl.
CPC ................................... *G06F 9/547* (2013.01)
USPC ............................. 709/227; 709/207; 709/237

(58) Field of Classification Search
CPC .................................................. H04L 65/1006
USPC ............................................ 709/207, 237, 227
See application file for complete search history.

(56) References Cited

U.S. PATENT DOCUMENTS

| 7,554,927 B2 | 6/2009 | Hanna et al. | |
|---|---|---|---|
| 2007/0276947 A1* | 11/2007 | Panattu et al. | 709/227 |
| 2008/0165762 A1* | 7/2008 | Gilfix et al. | 370/352 |
| 2008/0195718 A1* | 8/2008 | Hu et al. | 709/207 |
| 2009/0164591 A1 | 6/2009 | Chadli | |

* cited by examiner

*Primary Examiner* — Glenford Madamba
(74) *Attorney, Agent, or Firm* — Holland & Knight LLP; Brian J. Colandreo, Esq.; Jeffrey T. Placker, Esq.

(57) ABSTRACT

Providing SIP application server interoperability, including detecting at a first SIP application server an event necessitating that work be performed in relation to a SIP application session that is managed by a second SIP application server, creating a SIP message object carrying a set of instructions representing the work, and sending the SIP message object for delivery to the second SIP application server and performance of the instructions at the second SIP application server in relation to the SIP application session.

22 Claims, 3 Drawing Sheets

ASYNCHRONOUS INVOCATION MECHANISM IN SESSION INITIATION PROTOCOL (SIP) SERVER CLUSTERS

FIELD OF THE INVENTION

The present invention relates to computer networks in general, and more particularly to server interoperability in Session Initiation Protocol (SIP) server cluster environments.

BACKGROUND OF THE INVENTION

The Session Initiation Protocol (SIP) is a protocol for creating, modifying, and terminating computer network-based communication sessions, such as for an Internet-based telephone call between two or more participants. An individual SIP-based communication session is often referred to as a SIP Session and can be managed by a SIP application server running a SIP container that manages the SIP signaling. Multiple SIP sessions may be related to each other according to application logic, such as in a conferencing application, and may thus be thought of as being part of a single logical entity, which may be referred to as a SIP application session.

In a SIP application server, multiple SIP application sessions are managed by the SIP container. In large computer network-based communications environments capable of managing hundreds or thousands of individual SIP application sessions, a clustered architecture is often employed, where a cluster of SIP application server nodes, each node running an instance of a SIP application server, communicate with SIP clients via a SIP proxy. The SIP proxy routes SIP communications belonging to any given SIP application session from the SIP client to the appropriate SIP application server node that manages the SIP application session. This role performed by the SIP proxy is referred to as "maintaining SIP session affinity" and is typically used in cluster architectures where SIP application sessions are not kept in a central data layer that all SIP servers can access so as to maintain better cluster performance in the form of better throughput per node.

Ideally, all events related to a specific SIP application session should be invoked at a single SIP application server that manages the SIP application session, whereupon the SIP application server performs event-related tasks. However, in some situations an event is invoked at a SIP application server in a cluster that affects the state of a SIP application session that is managed by another SIP application server in the cluster. Examples of such events include non-SIP container events such as the receipt of a non-SIP protocol message that was delivered to the server not via the SIP proxy and its per-application session distribution mechanism, or a non-SIP application timer execution event. These events may require modifying aspects of a SIP session that is handled by another server in the cluster. When this occurs, it is imperative that the SIP application server that manages the SIP application session, and not the server where the event is invoked, perform the event-related tasks.

SUMMARY OF THE INVENTION

In one aspect of the invention a method is provided for SIP application server interoperability, the method including detecting at a first SIP application server an event necessitating that work be performed in relation to a SIP application session that is managed by a second SIP application server, creating a SIP message object carrying a set of instructions representing the work, and sending the SIP message object for delivery to the second SIP application server and performance of the instructions at the second SIP application server in relation to the SIP application session.

In another aspect of the invention a system is provided for SIP application server interoperability, the system including a first SIP application server, and a second SIP application server, where the first SIP application server is configured to detect an event necessitating that work be performed in relation to a SIP application session that is managed by the second SIP application server, create a SIP message object carrying a set of instructions representing the work, and send the SIP message object for delivery to the second SIP application server and performance of the instructions at the second SIP application in relation to the SIP application session, and where the second SIP application server is configured to receive the SIP message object, and perform the instructions in relation to the SIP application session. A computer program product therefor is also provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
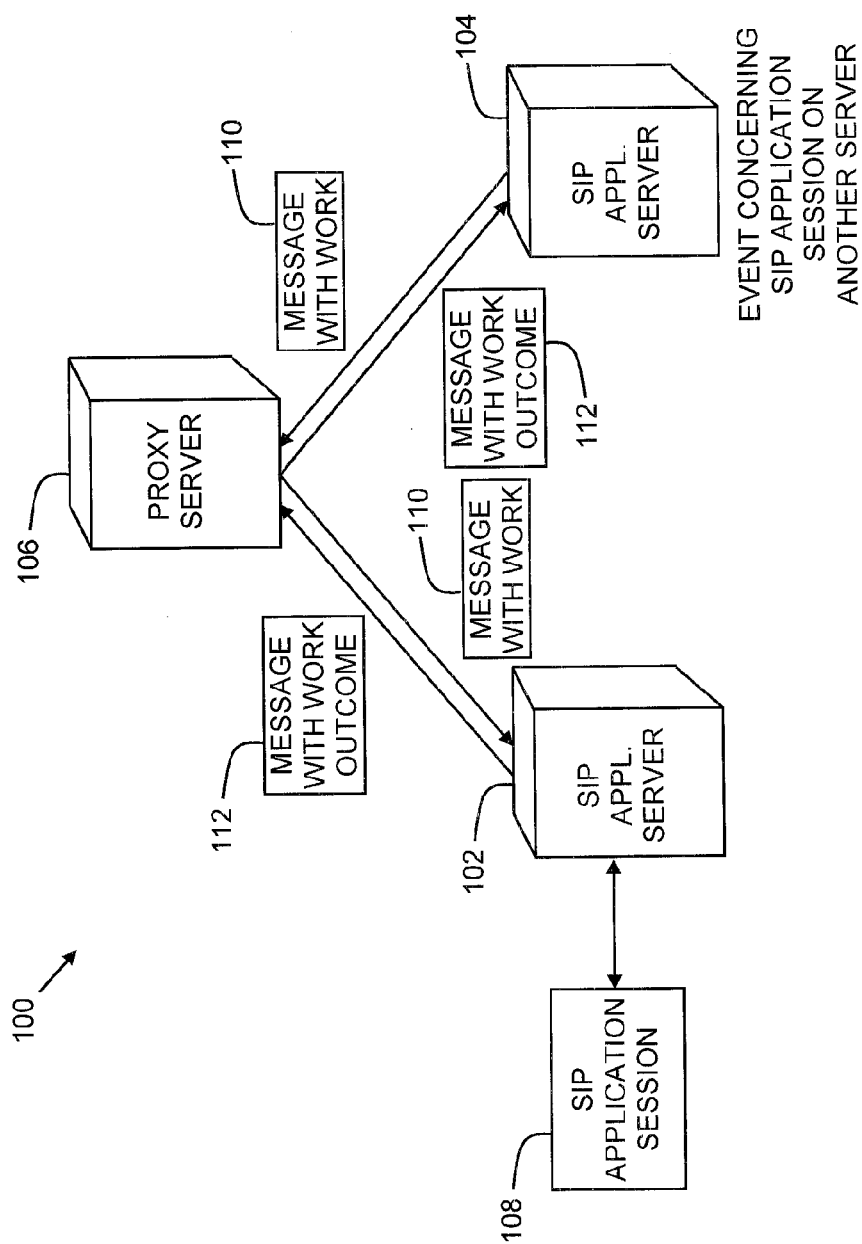
FIG. 1 is a simplified conceptual illustration of a system for server interoperability in Session Initiation Protocol (SIP) server cluster environments, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for server interoperability in Session Initiation Protocol (SIP) server cluster environments, constructed and operative in accordance with an embodiment of the invention. In the system of FIG. 1, a cluster, generally designated 100, of SIP application servers is shown, including at least a SIP application server 102 and a SIP application server 104. SIP application servers 102 and 104 may be understood as representing logical instances of a SIP application that manages SIP application sessions and that are both executed by the same computer or by different computers. The SIP application servers in cluster 100 are all preferably serviced by a SIP proxy 106.

Operation of the system of FIG. 1 may be understood in the context of an exemplary scenario as follows. A SIP application session 108 is shown as being managed by SIP application server 102. An event is detected at SIP application server 104. SIP application server 104 determines that work in the form of one or more processing tasks is to be performed in connection with the event. Furthermore, SIP application server 104 determines that the event is associated with SIP application session 108 that is being managed by SIP application server 102, and that the work should, therefore, be performed by SIP application server 102. SIP application server 104 creates a SIP message object 110 into which SIP application server 104 includes a set of one or more instructions representing work that is to be performed in connection with the event, such as by serializing the set of instructions into a text representation and inserting the serialized set of instructions into SIP message object 110. SIP application server 104 preferably provides an indicator within SIP message object 110 that SIP message object 110 carries the set of instructions representing work to be performed by SIP application server 102, such as by including an "ASYNWORK" label. SIP application server 104 also preferably includes within SIP message object 110 the session ID of SIP application session 108, preferably by encoding the session ID of SIP application session 108 into a URI header of SIP message object 110. An example of SIP message object 110 is as follows:

```
ASYNWORK
sip:task@esx2vm4.haifa.ibm.com:5066;transport=udp;ibmappid=my.server2.1233487
608042.0_1 SIP/2.0
From:
<sip:server1@ibm.com>;tag=9866785957914922_my.server1.1233487541660.0_1_0
To: <sip:server2@ibm.com>
Call-ID: 6205148770738406@9.148.46.62
```

-continued

```
Max-Forwards: 70
CSeq: 2 ASYNWORK
Content-Type: asynchwork/type
Content-Length: 261
Via: SIP/2.0/UDP 9.148.46.62:5062;ibmsid=my.server1.1233487541660.0__1__0
PO: 0
IBM-Destination:
<sip:task@esx2vm4.haifa.ibm.com:5066;transport=udp;ibmappid=my.server2.123348
7608042.0__1>
...
[The body of the message holds the serialized set of instructions representing the work
to be performed by the recipient.]
```

SIP application server 104 sends SIP message object 110 to SIP proxy 106 as a simple SIP request to SIP proxy 106 to forward SIP message object 110 to the appropriate SIP application server. SIP proxy 106 determines that the session ID indicated in SIP message object 110 is of SIP application session 108 which is being managed by SIP application server 102, whereupon SIP proxy 106 forwards SIP message object 110 to SIP application server 102. SIP application server 102 receives SIP message object 110, determines that it includes the set of instructions representing the work to be performed in connection with SIP application session 108, and performs the work. When the work has been performed, SIP application server 102 preferably creates a SIP message object 112 indicating an outcome of the work (i.e., of the performance of the set of instructions), such as by indicating the success or failure of the work and including a completion reason or explanation, and sends it to SIP proxy 106 to be forwarded to SIP application server 104, whereupon SIP application server 104 may inform a predefined listener of the outcome.

Some specific applications in which the system of FIG. 1 may be used include where a SIP application server wishes to invalidate a SIP application session that is hosted on another SIP application server, where a SIP application server wishes to send a message regarding a SIP application session that is hosted on another SIP application server, and where a SIP application server wishes to schedule a timer task associated with a SIP application session that is hosted on another SIP application server.

Any of the elements shown in FIG. 1 are preferably executed by or otherwise made accessible to a computer, such as by implementing any of the elements in computer hardware and/or in computer software embodied in a computer-readable medium in accordance with conventional techniques.

Figure 2:
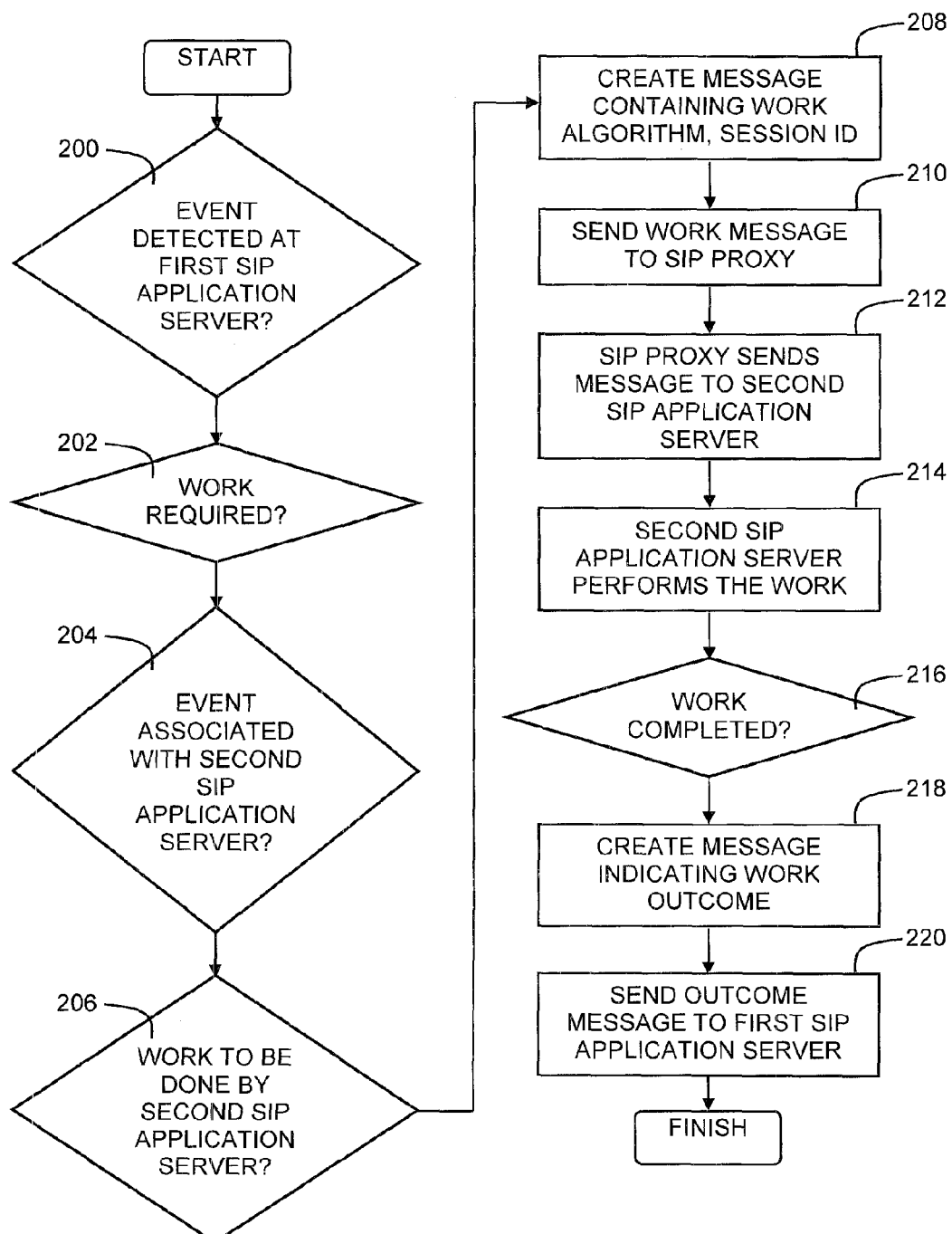
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, an event is detected at a first SIP application server (step 200). If work in the form of one or more processing tasks is to be performed in connection with the event (step 202), and if the event is associated with a SIP application session that is being managed by a second SIP application server (step 204), and if the work should be performed by the second SIP application server (step 206), the first SIP application server creates a SIP message object (step 208) carrying a set of instructions representing the work that is to be performed, including the session ID of the SIP application session and an indicator that the object includes a set of instructions representing the work to be performed. The first SIP application server sends the SIP message object to a SIP proxy (step 210). The SIP proxy sends the SIP message object to the second SIP application server (step 212). The second SIP application server performs the work indicated in the SIP message object and in connection with the SIP application session (step 214). When the work has been performed (step 216), the second SIP application server creates a SIP message object indicating an outcome of the work (step 218), and sends it to the SIP proxy to be forwarded to the first SIP application server (step 220).

Figure 3:
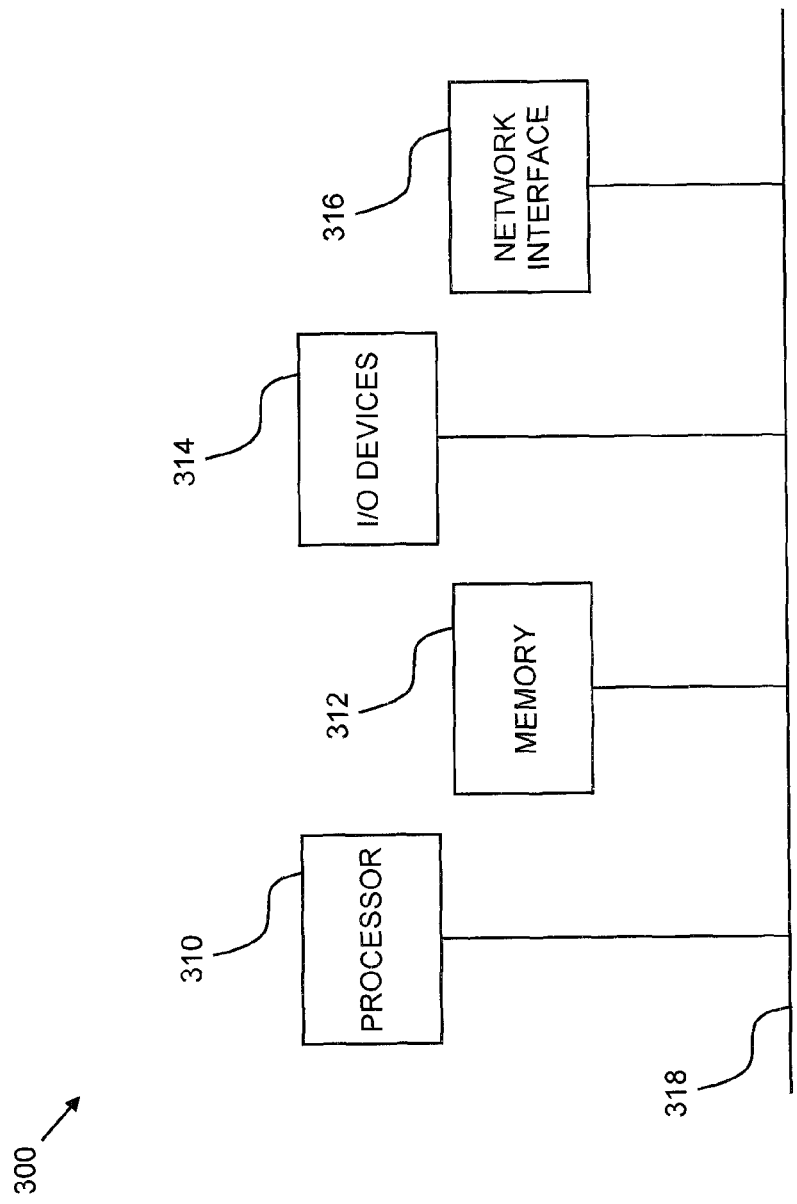
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for SIP application server interoperability, the method comprising:
    detecting at a first SIP application server an event;
    determining that work must be performed in relation to the event, that the event is associated to a SIP application session that is managed by a second SIP application server, and that the work to be performed in relation to the event must be performed by the second SIP application server;
    creating, responsive to the determination, a SIP message object carrying a set of instructions representing said work; and
    sending said SIP message object for delivery to said second SIP application server and performance of said instructions at said second SIP application server in relation to said SIP application session;
    wherein the work to be performed by said second SIP application server includes at least one of: invalidating said SIP application session hosted on said second SIP application server and scheduling a timer task associated with said second SIP application session hosted on said second SIP application server.

2. The method according to claim 1 wherein creating the SIP message object carrying the set of instructions representing said work comprises serializing said set of instructions into a text representation and inserting said serialized set of instructions into said SIP message object.

3. The method according to claim 1 wherein creating the SIP message object carrying the set of instructions representing said work comprises including in said SIP message object a session ID of said SIP application session and an indicator that said SIP message object includes a set of instructions representing work to be performed.

4. The method according to claim 1 and further comprising performing at said second SIP application server said set of instructions carried within said SIP message object.

5. The method according to claim 4 and further comprising performing at said second SIP application server said set of instructions in connection with said SIP application session.

6. The method according to claim 4 and further comprising:
    creating a second SIP message object indicating an outcome of the performance of said instructions; and
    sending said second SIP message object for delivery to said first SIP application server.

7. The method according to claim 1 wherein sending said SIP message object for delivery to said second SIP application server and performance of said instructions at said second SIP application server in relation to said SIP application session comprises sending said SIP message object to a SIP proxy for forwarding to said second SIP application server.

8. The method according to claim 1 wherein said detecting, creating, and sending operations are implemented in at least one of:
    computer hardware configured to perform said operations, and
    computer software embodied in a tangible, computer-readable storage medium.

9. A system for SIP application server interoperability, the system comprising:
    a first SIP application server; and
    a second SIP application server,
    wherein said first SIP application server is configured to detect an event;
    determine that work must be performed in relation to the event, that the event is associated to a SIP application session that is managed by said second SIP application server, and that the work to be performed in relation to the event must be performed by the second SIP application server,
    create, responsive to the determination, a SIP message object carrying a set of instructions representing said work, and
    send said SIP message object for delivery to said second SIP application server and performance of said instructions at said second SIP application in relation to said SIP application session,
    wherein said second SIP application server is configured to receive said SIP message object and perform said instructions in relation to said SIP application session,
    wherein the work to be performed by said second SIP application server includes at least one of: invalidating said SIP application session hosted on said second SIP application server and scheduling a timer task associated with said second SIP application session hosted on said second SIP application server, and
    wherein said SIP application servers are implemented in at least one of:
    computer hardware, and
    computer software embodied in a tangible, non-transitory computer-readable storage medium.

10. The system according to claim 9 wherein said first SIP application server is configured to serialize said set of instructions into a text representation and insert said serialized set of instructions into said SIP message object.

11. The system according to claim 9 wherein said first SIP application server is configured to include in said SIP message object a session ID of said SIP application session and an indicator that said SIP message object includes a set of instructions representing work to be performed.

12. The system according to claim 9 wherein said second SIP application server is configured to perform said set of instructions carried within said SIP message object.

13. The system according to claim 9 wherein said second SIP application server is configured to perform said set of instructions in connection with said SIP application session.

14. The system according to claim 9 wherein said second SIP application server is configured to
    create a second SIP message object indicating an outcome of the performance of said instructions, and
    send said second SIP message object for delivery to said first SIP application server.

15. The system according to claim 9 wherein said first SIP application server is configured to send said SIP message object to a SIP proxy for forwarding to said second SIP application server.

16. A computer program product for SIP application server interoperability, the computer program product comprising:
- a non-transitory computer-readable storage medium; and
- computer-readable program code embodied in said non-transitory computer-readable storage medium, wherein said computer-readable program code is configured to
- detect at a first SIP application server an event;
- determine that work must be performed in relation to the event, that the event is associated to a SIP application session that is managed by a second SIP application server, and that the work to be performed in relation to the event must be performed by the second SIP application server;
- create, responsive to the determination, a SIP message object carrying a set of instructions representing said work; and
- send said SIP message object for delivery to said second SIP application server and performance of said instructions at said second SIP application server in relation to said SIP application session;
- wherein the work to be performed by said second SIP application server includes at least one of: invalidating said SIP application session hosted on said second SIP application server and scheduling a timer task associated with said second SIP application session hosted on said second SIP application server.

17. The computer program product according to claim 16 wherein said computer-readable program code is configured to serialize said set of instructions into a text representation and insert said serialized set of instructions into said SIP message object.

18. The computer program product according to claim 16 wherein said computer-readable program code is configured to include in said SIP message object a session ID of said SIP application session and an indicator that said SIP message object includes a set of instructions representing work to be performed.

19. The computer program product according to claim 16 wherein said computer-readable program code is configured to perform at said second SIP application server said set of instructions carried within said SIP message object.

20. The computer program product according to claim 19 wherein said computer-readable program code is configured to perform at said second SIP application server said set of instructions in connection with said SIP application session.

21. The computer program product according to claim 19 wherein said computer-readable program code is configured to
- create a second SIP message object indicating an outcome of the performance of said instructions, and
- send said second SIP message object for delivery to said first SIP application server.

22. The computer program product according to claim 16 wherein said computer-readable program code is configured to send said SIP message object to a SIP proxy for forwarding to said second SIP application server.

* * * * *